US012311685B2

(12) United States Patent
Pfeiffer et al.

(10) Patent No.: US 12,311,685 B2
(45) Date of Patent: May 27, 2025

(54) METHOD FOR PRINTING THE SURFACE OF A WORKPIECE WITH A DECORATIVE PATTERN, AND DEVICE THEREFOR

(71) Applicant: SWISS KRONO Tec AG, Lucerne (CH)

(72) Inventors: Sabrina Pfeiffer, Kyritz (DE); Falko Geitz, Zernitz-Lohm (DE)

(73) Assignee: SWISS KRONO Tec AG, Lucerne (CH)

( * ) Notice: Subject to any disclaimer, the term of this patent is extended or adjusted under 35 U.S.C. 154(b) by 204 days.

(21) Appl. No.: 18/022,111

(22) PCT Filed: Aug. 24, 2021

(86) PCT No.: PCT/EP2021/073355
§ 371 (c)(1),
(2) Date: Feb. 17, 2023

(87) PCT Pub. No.: WO2022/043307
PCT Pub. Date: Mar. 3, 2022

(65) Prior Publication Data

US 2023/0339234 A1 Oct. 26, 2023

(30) Foreign Application Priority Data

Aug. 24, 2020 (EP) .................................... 20192455

(51) Int. Cl.
*B41J 3/407* (2006.01)
*B41J 11/00* (2006.01)

(52) U.S. Cl.
CPC ......... *B41J 3/407* (2013.01); *B41J 11/00222* (2021.01); *B41J 2203/01* (2020.08)

(58) Field of Classification Search
CPC .. B41J 3/407; B41J 11/00222; B41J 2203/01; B41J 11/0015; B41J 11/002; B41J 29/38; B41J 15/16; B41M 5/0017; B41M 5/0011
See application file for complete search history.

(56) References Cited

U.S. PATENT DOCUMENTS

| | | | | |
|---|---|---|---|---|
| 8,746,871 | B2 | 6/2014 | Chiwata | |
| 9,796,194 | B2 | 10/2017 | Skorzik et al. | |
| 2013/0293605 | A1 | 11/2013 | Bar-Tal et al. | |
| 2016/0152052 | A1* | 6/2016 | Namiki | G01N 29/4427 73/602 |

FOREIGN PATENT DOCUMENTS

| | | |
|---|---|---|
| EP | 2927003 | 10/2015 |
| EP | 3072700 | 9/2016 |
| JP | 2005138463 | 6/2005 |
| WO | 2020078606 | 4/2020 |

OTHER PUBLICATIONS

International Search Report issued on Dec. 1, 2021 in corresponding Application No. PCT/EP2021/073355; 5 pages.

* cited by examiner

*Primary Examiner* — Justin Seo
(74) *Attorney, Agent, or Firm* — Andrew M. Calderon; Calderon Safran & Wright P.C.

(57) ABSTRACT

The disclosure relates to a method for printing a decoration on the surface of a workpiece by means of digital printing equipment. The printing equipment includes at least one application unit for applying a liquid to the workpiece and at least one dryer unit for drying the workpiece. The method includes: providing information in an electric control unit of the printing equipment about the expected moisture of the workpiece to be dried, determining drying parameters with which the at least one dryer unit can be operated on the basis of the information provided, and drying the workpiece by means of the at least one dryer unit using the determined drying parameters.

14 Claims, No Drawings

METHOD FOR PRINTING THE SURFACE OF A WORKPIECE WITH A DECORATIVE PATTERN, AND DEVICE THEREFOR

FIELD OF INVENTION

The invention relates to a method for printing a decoration on the surface of a workpiece by means of digital printing equipment, the printing equipment comprising at least one application unit for applying a liquid to the workpiece and at least one dryer unit for drying the workpiece. The invention also relates to digital printing equipment for conducting such a method.

BACKGROUND

Digital printing equipment with an application unit and a dryer unit have been known from the prior art for many years. They are used for printing on a wide range of workpieces. For example, WO 2020/078606 A1 discloses a relevant system that is used to print the surface of a non-absorbent substrate. In this case, the surface tension of the substrate surface must first be modified in such a way that it can be wetted at all by a water-based ink, for example. Once the ink has been applied, the dryer unit is used to strongly heat the applied liquid layer, i.e. the decoration, within 1 second, thereby ensuring rapid evaporation of solvents contained in the liquid. This fixes the applied ink and improves the printed image.

EP 2 927 003 B1, on the other hand, describes a method in which the surface temperature of the workpiece is changed by means of the dryer unit. The method described in that case is based on the knowledge that solvents contained in the applied ink evaporate more quickly on a warm surface of the workpiece and the viscosity of the ink thus increases rapidly, so that colored dots, such as those applied during digital printing, can hardly spread and possibly too little. If, however, the surface of the workpiece is cold, the solvents evaporate slowly and the viscosity of the ink remains low for a long time, so that the colored dots can spread easily and possibly too much. By using a dryer unit, the temperature of the surface of the workpiece to be printed can be adjusted and brought to the desired value.

Drying by means of at least one dryer unit is also very important when printing on, for example, a paper web using digital printing equipment. If the workpiece is wetted, for example printed, with the liquid in the application unit, the moisture content of the printed surface has a large impact on whether and possibly how far the applied liquid penetrates the surface or spreads across it. The evaporation and outgassing of solvents is also very dependent on the moisture of the printed-on or wetted surface.

The moisture itself also depends on a number of parameters. This relates, for example, to the moisture of the workpiece to be printed on, such as the paper moisture of the base paper. This is influenced by the hygroscopy during storage, for example the temperature and humidity of the room in which the base paper is stored. Application quantities of a primer, for example, of a possibly multi-colored decoration or sealing layers can also influence the moisture of the workpiece and its upper side and surface. However, this not only affects the printed image, but also the paper web run. A paper web to be printed on is usually guided in the digital printing equipment over multiple guide rollers, which on the one hand convey the paper web to be printed on through the printing equipment and on the other hand ensure that the paper web is laid as smoothly as possible. This is referred to as web tension, which must be maintained and adjusted in such a way that, on the one hand, the paper web is conveyed but does not tear and, on the other hand, the paper web is as smooth and full-surface as possible, i.e. without wrinkles, against the respective rolls and, in particular, can be guided along the at least one application unit.

A primer refers to a layer on which the colored printed dots forming the particular decoration are applied. The layer can also be referred to as primer coating. The layer can have a base color, such as white, to compensate for any color irregularities of the surface of the workpiece to be printed on and to ensure that the basic conditions for printing the decoration are reproducible and predictable. Alternatively or additionally, the layer is designed as a color uptake layer and does not change or does not only change the optical appearance of the surface, for example its color, but also its capacity for absorbing the color.

Currently, it is the task of the operator of the printing equipment to manually adjust the dryer unit as well as any air extractors and guide rollers on the basis of his experience in order to be able to carry out the method as optimally as possible and to produce as little waste as possible. To this end, he can use a control panel to adjust the drying capacity, transportation speed of the workpiece inside the equipment and the roller tension. This controls the paper moisture and paper web guide.

The disadvantage is that experienced staff is required who can call upon their experience; also, the method cannot be conducted in a manner that it reproducible and predictable.

SUMMARY OF INVENTION

The invention is therefore based on the task of eliminating or at least reducing the disadvantages of the prior art.

The invention solves the task addressed by means of a method for printing a decoration on the surface of a workpiece by means of digital printing equipment, the printing equipment comprising at least one application unit for applying a liquid to the workpiece and at least one dryer unit for drying the workpiece and the method comprising the following steps:

a. providing information in an electric control unit of the printing equipment about the expected moisture of the at least one workpiece to be dried,
b. determining drying parameters with which the at least one dryer unit can be operated on the basis of the information provided and
c. drying the workpiece by means of the at least one dryer unit using the determined drying parameters.

DETAILED DESCRIPTION OF INVENTION

The method according to the invention renders possibles an automated and reproducible execution of the method and thus of the printing of the surface of a workpiece. Furthermore, a large number of workpieces of identical or at least almost identical workpieces can be produced with as little waste as possible. First, information on the expected moisture of the workpiece to be dried is supplied to the electric control unit, for example a data processing device. The electric control unit then determines drying parameters, in particular which contain or are control parameters for the dryer unit. For example, these drying parameters contain the drying capacity, a drying temperature, a transportation speed at which the workpiece to be dried is moved through the dryer unit, and/or the type of dryer. The last parameter is especially advantageous if the dryer unit has various dryers that can be used as needed. With the drying parameters determined in this way, the dryer unit is operated to dry the respective workpiece.

The supply of information preferably contains the following steps:

a1. Measuring the moisture of the surface of the workpiece by means of at least one moisture sensor, a2. Providing the measured moisture in the electric control unit.

The device used to carry out such a method features at least one moisture sensor that is configured to measure the moisture of the surface of the workpiece. The at least one sensor is also configured to transmit the measured values it determines to the electronic data processing device or another type of electric control unit. The measured values allow a conclusion to be drawn about the moisture of the surface of the workpiece to be dried and are supplied in the electric control unit as information about the expected moisture. Preferably, the moisture is determined as close as possible upstream of the dryer unit, so that the measured values describe as effectively as possible the moisture exhibited by the workpiece upon entering the dryer unit. On the other hand, the transportation speed at which the workpiece is transported to the drying unit and the time between the point at which the measurement is conducted and the start of the drying must be coordinated in such a way that the electric control unit, in particular the electronic data processing device, has enough time to determine the drying parameters before the workpiece to be dried is guided into the dryer. This time depends, on the one hand, on the transportation speed, and on the measurement data and speed of the data processing device on the other.

Preferably, the moisture is determined by means of an infrared (IR), near infrared (NIR) or microwave measurement method and/or by determining an L value. Of course, a combination of different methods is possible and sometimes advantageous. The choice of actual method depends particularly on what information is required to be able to determine the drying parameters as optimally as possible. For example, it may be beneficial to determine the moisture only in as narrow a range as possible on the surface, for example to a depth of 1 mm. In other methods, it is beneficial to also determine the moisture in deeper layers, for example to a depth of 3 mm or 5 mm, and not only on the surface of the workpiece. If the workpiece to be printed on is, for example, a paper web or a pre-cut decorative paper, the moisture is preferably determined to a depth of several hundredths of a millimeter up to some tenths of a millimeter, for example from 0.01 mm to 0.5 mm.

In a preferred embodiment, the expected moisture is calculated. This is preferably done on the basis of information about at least one quantity of liquid applied to the workpiece before drying, at least one temperature, preferably a temperature profile over time, particularly of the workpiece, the room and/or the applied liquid and/or a moisture of the workpiece. If at least one quantity of liquid has been applied to the workpiece before drying, it naturally has a significant impact on the moisture, especially on the upper side and surface of the workpiece. The liquid applied may be, for example, a primer, a primer coating, ink or a protective layer. The temperature of the workpiece, the room and/or the applied liquid has an impact on how much moisture the workpiece can absorb, for example, and/or how much moisture penetrates into the workpiece.

Preferably, the information provided about the expected moisture and the determined drying parameters are, in each case, a function of the position on the surface of the workpiece. In other words, both the expected moisture and the drying parameter are specified depending on location. This is especially advantageous if, for example, the expected moisture is inhomogeneously distributed across the surface of the workpiece. This can happen, for example, if printing ink is applied to different degrees, since, for example, some areas of the surface of the workpiece are printed more heavily and thus with more ink than other areas. The use of different inks, for example for different colors, can also mean that moisture is applied to the surface of the workpiece and/or penetrates into the upper side of the workpiece to different degrees.

An inhomogeneous amount of moisture can also be caused by the primer coating being applied in different strengths to different points on the upper side of the workpiece. This is the case, for example, when color fluctuations, for example a cloudiness of the workpiece to be printed on, such as a paper web, are to be compensated by the primer coating, said fluctuations having been previously detected and evaluated by a camera, for example. In this case, it makes sense to apply more primer coating to darker points on the upper side of the workpiece to be printed on than lighter points. As a result, not only different quantities of primer coating are applied, but also different degrees of moisture.

Advantageously, the at least one drying unit is configured to dry different areas of the surface of the workpiece to different degrees. This renders it possible to react to different degrees of moisture in the respective areas of the surface of the workpiece and to create a homogeneous level of moisture. For example, the dryer unit may comprise multiple drying modules, for example 3, 5 or 7 drying modules, that are arranged in such a way that they dry different areas of the workpiece. In this way, they can be arranged, for example, adjacent to each other in one direction perpendicular to the transportation direction of the workpiece through the printing equipment. However, this arrangement not only enables inhomogeneous distributions of moisture that may be present on the surface of the workpiece upstream of the drying unit to be rendered homogeneous. The targeted creation of an inhomogeneous moisture level of the surface of the workpiece is also possible and may be advantageous. As previously explained, the moisture of the surface of the workpiece affects, for example, the behavior of an ink or another applied liquid on the surface. This may be desirable to various extents at different points, so that inhomogeneous moisture is advantageous.

Such a "target distribution of moisture", which may also be referred to as target moisture, is preferably stored in an electronic memory that can be accessed by the electric control unit, in particular the electronic data processing device, of the printing system. This target moisture is preferably taken into account when determining the drying parameters.

In preferred embodiments of the method, the workpiece is dried multiple times, which preferably occurs in different dryer units. In the process, steps a. and b. of the method are preferably carried out before each drying cycle, i.e. information about the expected moisture is provided and drying parameters for the dryer unit are determined. They are transmitted to the dryer unit, so that they can be used to operate the dryer unit. Particularly preferably, the workpiece is dried before and/or after the application of at least one liquid to the workpiece. Preferably, liquids are applied to the surface of the workpiece multiple times. This is preferably done in multiple application units, which may be rollers, printing heads or other printing means, for example. The respective applied moisture, where applicable as a function of the position on the surface of the workpiece, is stored in an electronic memory and supplied to the electric control unit. In this way, for example, a primer coating can be applied to the surface before different colored ink is applied, for example, in multiple printing cycles by multiple printing heads that represent the application units. Preferably, the workpiece and in particular its surface are dried after each application of a liquid. To this end, the workpiece preferably passes through a dryer unit after each application. Particularly preferably, a dryer unit is also passed through before the first application of a liquid and after the final application of a liquid.

The printing system thus preferably has multiple application units, by means of which a liquid is applied to the workpiece, the workpiece being dried before and/or after the application of the at least one liquid.

Advantageously, the moisture of the surface of the workpiece is measured by means of at least one moisture sensor after drying by means of at least one dryer unit and compared with a predetermined target value, wherein a measure for the deviation of the measured moisture from the predetermined target value is incorporated into the future determination of the drying parameters. It is thus advantageous to not only determine the moisture of the surface of the workpiece before the actual drying in order to determine the drying parameters, but also to measure the moisture again or for the first time after the actual drying. On the one hand, it is thus possible to check whether the target moisture has been achieved, i.e. whether the determined drying parameters reach the desired target. If this is the case, it is not necessary to change the routines and settings in the electric control unit that determines the drying parameters. However, if the deviation is greater than a predetermined limit value, the calculations used to determine the drying parameters are adjusted and modified in the electric control unit.

By measuring the actual moisture, the expected moisture can be determined more effectively for dryer units arranged later in the production process and therefore better information can be supplied to the electric control unit. The future determination of drying parameters may refer to drying parameters of dryer units used at a later point during the printing of the same surface of the workpiece. The future determination of drying parameters can, however, also refer to drying parameters used during the printing of surfaces of other workpieces.

Preferably, the workpiece is a paper web and a measure of a wrinkle formation on this paper web is detected in the printing equipment. This preferably occurs by way of a 2D and/or 3D profile measurement which, particularly preferably, is carried out by means of a laser scanner. The detected measure of wrinkle formation is compared to a predetermined target value. If the deviation between the detected measure and this target value is greater than a predetermined limit value, the tension applied to the workpiece in the printing equipment is modified. In this case, the tension is either increased or reduced depending on the deviation.

The invention also solves the addressed task by way of digital printing equipment for carrying out a method described here that comprises at least one application unit for applying a liquid to the workpiece and at least one dryer unit for drying the workpiece and an electric control unit, in particular an electronic data processing device, that is configured to carry out one of the methods described here.

The working width of digital printing equipment is preferably at least 1300 mm, preferably at least 1600 mm, particularly preferably at least 2000 mm and at most 2300 mm, preferably at most 2200 mm and particularly preferably at most 2100 mm. The speed of the equipment at which the surface to be printed is moved through the equipment is preferably at least 80 m/min, preferably at least 100 m/min and particularly preferably at least 130 m/min and at most 270 m/min, preferably at most 200 m/min and particularly preferably at most 140 m/min when printing on paper. When printing onto heavier objects, for example wood-based material panels, the speed is preferably at least 60 m/min, preferably at least 70 m/min and particularly preferably at least 80 m/min and at most 110 m/min, preferably at most 100 m/min and particularly preferably at most 90 m/min.

If a primer is applied to the surface to be printed on, the applied quantity is preferably at least 1 $g/m^2$, preferably at least 2 $g/m^2$ and especially preferably at least 3 $g/m^2$ and at most 10 $g/m^2$, preferably at most 6 $g/m^2$, especially preferably at most 4 $g/m^2$.

The moisture of the surface to be printed on is an important aspect when the aim is to obtain a printed image that is as good and true to the template as possible and to keep the amount of waste produced to a minimum. Other aspects concern, for example, the printing parameters and therefore the digital template.

In these methods described here, a decoration to be printed is printed onto a plurality of print surfaces by means of digital printing equipment, the method comprising the following steps:

A. providing a digital template and reference measurement data of a decoration to be printed, said data being hyperspectral and spatially resolved,
B. printing the decoration to be printed onto a print surface using the digital template,
C. measuring measured variables of the decoration printed on the print surface, thereby obtaining print measurement data that are hyperspectral and spatially resolved,
D. comparing the print measurement data with the reference measurement data and determining a measure of deviation of the print measurement data from the reference measurement data,
E. modifying the digital template if the measure of the deviation meets a predetermined criterion,
F. repeating steps B to F.

In the method according to the invention, the comparison of the printed decoration with the decoration to be printed is done using the various measurement data. The print measurement data are compared with the reference measurement data. Consequently, the reference measurement data correspond to the data that has been or would be measured on a decoration that may serve as a reference, i.e. it corresponds exactly to the desired decoration. The invention is therefore based on the knowledge that it is not necessary to compare entire images in order to determine the quality of the printed decoration if it is possible to define measurement data whose comparison for the printed decoration and the decoration to be printed eliminates the need to compare images or entire decorations. In this case, the measurement data are spatially resolved, so that fluctuations in the printing quality, which may occur in particular due to the parameters mentioned above, can also be established, even if they emerge on a spatially small scale, for example within a single printed decoration. In addition, the measurement data are hyperspectral, so that information either side of visible light is included and can be compared.

The digital template preferably corresponds to the control parameters with which the printing equipment is controlled. In particular, this refers to control commands concerning at which point on the print surface which amount of which ink should be applied. Preferably, the control parameters contain all information needed to operate a printing unit of the printing equipment.

With such a method, if a deviation is detected when comparing the print measurement data with the reference measurement data that meets a predetermined criteria, for example a predetermined deviation is exceeded, there is an adequate reaction to this deviation. In particular, this is achieved by modifying the digital template. This ensures that, in the case of a decoration printed with the modifying digital template, the measure of the deviation is smaller and thus may no longer meet the predetermined criterion. If the criterion is no longer met, the printed decoration corresponds to the desired decoration in terms of quality. If, on the other hand, the criterion is met, the digital template must be adjusted, so that it can be assumed that the printed decoration does not correspond to the print quality requirements and must be discarded as waste.

In a preferred embodiment, a time lag between two consecutive embodiments of step B does not depend on whether the digital template has been modified. The production, in particular the interval at which the decoration is printed onto the print surfaces, is consequently not modified, so that a correction or modification of the digital template can be carried out inline, i.e. without interrupting or delaying the production process.

Preferably, the provision of the reference measurement data in step a. includes the following steps:

A1. Providing a digital template of a decoration to be printed,

A2. Printing the decoration to be printed onto a reference surface using the digital template, A3. Measuring the measured variables of the decoration printed onto the reference surface, so that the reference measurement data are obtained.

The digital template of a decoration to be printed is supplied to the printing equipment in a manner known from the prior art. The printing equipment is controlled by this digital template to print the decoration to be printed onto the reference surface. Here, the reference surface preferably corresponds in material, size, haptics and/or color to the print surfaces to be printed during the method. The decoration printed onto the reference surface is then measured by measuring the measurement variables. Reference measurement data is thus obtained. The better the reference surface corresponds to the print surface, the easier and more precise the comparison of the reference measurement data with the print measurement data. If the deviation between reference surface and print surface is known, a conversion can be performed by a conversion tool, so that the different measurement data correspond to each other more effectively. However, this is in principle subject to errors and therefore it is advantageous to have as good a match as possible between the respective surfaces.

A major advantage of this method is that the reference measurement data that form the basis of the comparison in step D. of the method are actual measurement data that cannot be taken from a digitally available sample stored in an electronic memory. This eliminates the widespread problem of color fastness, since the method allows actual measurement data, namely reference measurement data, of an actually printed decoration to be compared with other actual measurement data, namely print measurement data, of another actually printed decoration. It just has to be ensured that the decoration printed onto the reference surface corresponds precisely to the desired decoration. The digital template would otherwise have to be adjusted until the decoration printed on the reference surface corresponds to the desired decoration.

In a preferred embodiment of the method, the predetermined criterion is met when a deviation of one or multiple print measurement data from corresponding reference measurement data is greater than a limit value predetermined for the corresponding measurement variables. Particularly preferably, the predetermined limit value is color and/or location dependent. In this way, weightings can be carried out. For example, if a particular color has a very large effect for a specific decoration, for example because it stands out brightly or is used to a particularly large extent to print the decoration, it is advantageous to ensure that the deviation is particularly small for this color. In this case, the color-dependent limit value for this color is selected to be particularly small, so that even relatively small deviations mean that the digital template has to be modified. If, however, a color is rather unimportant for a decoration, for example it barely features or can barely be perceived by the human eye, if at all, the color-dependent limit value can be selected. The same applies for dependencies in terms of location. Deviations at the edge of the decoration are possibly less relevant than deviations in the immediate field of vision, for example in the center of the decoration.

Preferably, the modification of the digital template in step E. includes the following steps:

E1. Checking whether the measure of deviation meets a correction criterion and

E2a. Modifying the digital template or

E2b. Emitting an optical and/or acoustic and/or electronic warning signal and terminating the method.

Some deviations between the reference measurement data and the print measurement data are due to reasons that cannot be rectified by modifying the digital template, for example. This applies, for example, in the event that an incorrect primer has been applied or color modifications have been caused by a change of supplier of printing ink or base paper. This cannot or can hardly be remedied by modifying the digital template, so that in this case a correction criterion is not met. The correction criterion indicates whether the deviation detected by the measure of deviation can be corrected by modifying the digital template. If this is the case, the decoration is modified in accordance with step E2a. If not, the method is terminated according to step E2b and a corresponding warning signal emitted.

In a preferred embodiment, during steps C. to E. of the method, at least one further print surface is printed with the decoration to be printed. In this case, the correction or modification of the digital template therefore has no effect on the decoration printed immediately afterwards. The modifications to the digital template only come into effect with the next decoration but one or an even later decoration. However, it is advantageous to print as few additional decorations as possible. Since they are printed with a digital template that has not yet been modified, they feature the same error as it has not yet been rectified. They are therefore also defective and possibly produced as waste. The question of how many print surfaces are printed during steps C. to E. depends on the performance of an electronic data processing device that is responsible for and carries out these steps. The quicker the data processing device is able to carry out the steps, the sooner the required modification of the digital template is available and the fewer additional decorations are printed. Of course, the interval frequency of the printing system also has a significant effect on this.

Preferably, modifications to the digital template and/or the determined measures of deviation for the different cycles of the method are saved and preferably stored in an electronic memory.

The print measurement data preferably relate to the same points and/or the same area of the decoration as the reference measurement data. It is therefore especially easy to compare the respective measurement data. In an especially preferred embodiment, the print measurement data and the reference measurement data relate to the entire decoration. In particular, this means that a plurality of measurement points is available at which the respective measurement data are determined and this plurality of measurement points extends across the entire decoration. Preferably, the measurement points are distributed equidistantly across the decoration.

A device for carrying out the method of the type described here preferably contains an electronic data processing device, especially a computer or a microchip, that is configured to carry out the method. The device has at least one sensor that is configured to record the measurement data. The at least one sensor transmits the measurement data as signals to the electronic data processing device, which receives them with a receiver module. A comparison module compares the measurement data transmitted by the at least one sensor with reference measurement data, which are preferably stored in an electronic memory to which the receiver module has access. In this way, a measure for the deviation is determined, which is then passed on to an evaluation module. This evaluation module checks whether the measure of the deviation has met a predetermined criterion. If this is the case, the modification that needs to be made to the digital template is determined in a modification module. Said modification is then transmitted to the printing system, so that the next decoration to be printed is printed using the modified digital template. The receiver module, the comparison module, the evaluation module and the modification module are realized in the electronic data processing device and may be designed as software, especially a computer program product.

In a preferred embodiment, the digital template does not correspond to the entire decoration, but only a part of it. This is useful when, for example, the data processing capacity is not sufficient to take the entire decoration in the method as a basis. In addition, it must be ensured that deviations that are only established in the part of the decoration that corresponds to the digital template are significant for the entire decoration. A monitoring system such as ACMS or AVT can be used to collect the measurement data. The collection of measurement data is done, for example, in a lab system. These measurement data can be easily compared to each other, wherein lab values or hyperspectral lines are compared, for example, which have a resolution of preferably 80 to 100 dpi, especially preferably 90 dpi, for each measured value. By means of a software known from the prior art, such as a software by the company ipac, a measure for the deviation can thus be determined that can be given in percent. It is therefore especially easy to determine criteria which, when met, mean that the digital template must be modified.

In a preferred embodiment, the method is terminated when 3, preferably 5, especially preferably 10, consecutive modifications of the digital template have not resulted in the measure of the deviation no longer meeting the predetermined criterion, i.e. the printed decorations correspond to the desired quality standard.

Preferably, an electronic certificate is created and especially preferably saved for the decoration printed on the print surface when the measure of the deviation does not meet the predetermined criterion, i.e. the desired quality has been achieved.

Embodiment Example 1

A wooden decor has been printed on paper digital printing equipment. In the specific embodiment example, the working width was 2070 mm. In the specific embodiment example, the speed was 135 m/min. A white decorative paper with a grammage of 65 $g/m^2$ was used as well as water-based CRYK ink and an inline primer application of approximately 3 $g/m^2$. The wood decor had the repeat pattern dimensions of 1400 mm length and the width 2070 mm. In the production facility, an inline monitoring system from the company ipac was installed across the entire width (2070 mm). A digital template of the decoration was stored. During production, print measurement data of each repeat pattern, i.e. each printed decoration, were detected and stored. From these print measurement data, the similarity index, i.e. a measure for the deviation, to the reference measurement data was calculated. The predetermined criterion was set at 92% before the start of production. So, if the measure for the deviation falls below 92% in this case, the digital template must be modified. In the case of repeat pattern 1264, a similarity index of 89% was calculated. The measurement data showed that the deviation in this case was largely on the b axis, i.e. on the yellow-blue line (e.g. 5% to blue). Since the deviation lies above the set tolerance, the measurement data are automatically transmitted to the Colorgate software and a corrected digital template of the wooden decor is calculated and saved. Following the automatic transmission to the output device, i.e. the printing equipment, the print file (digital template) used thus far for the printing order is automatically replaced by the corrected digital template of the wooden decor and made available as a print file for the following repeat pattern. Following the output of the corrected digital template of the wooden decor, a similarity index of 94% is calculated from the next print measurement data to the reference measurement data.

The period of time from the measurement of the print measurement data of an entire decoration to the output of the modified digital template of the wooden decor was one repeat pattern length (approximately 0.62 seconds). In this case, an entire repeat pattern was measured, saved and a deviation detected. The subsequent repeat pattern is still printed with the not yet corrected digital template, as this is the time required for the calculation and exchange.

Embodiment Example 2—Digital Print of a Decorative Panel

A wooden decor was produced on panel digital printing equipment (working width 2070 mm, panel size 2070 mm×2800 mm, speed 80 m/min, 8 mm HDF panels, coated white, CRYK water-based ink, inline primer application approximately 3 $g/m_2$). The wood decor has the repeat pattern dimensions of 2800 mm length and the width 2070 mm. The gap between the panels was 140 cm. In the production facility, an inline monitoring system from the company ipac was installed across the entire width (2070 mm). A digital template of the decoration was stored. During production, print measurement data of each repeat pattern, i.e. each printed decoration, is detected and stored. From these print measurement data, the similarity index to the reference measurement data is calculated. The predetermined criterion was set at 94% before the start of production. So, if the measure for the deviation falls below 94% in this case, the digital template must be modified. In the case of repeat pattern 863, a similarity index of 92% was calculated. The measurement data showed that the deviation largely lies on the L axis>light-dark (e.g. 4% to dark). Since the deviation lies above the set tolerance, the measurement data are automatically transmitted to the Colorgate software and a corrected digital template of the wooden decor is calculated and saved. Following the automatic transmission to the output device, the print file (digital template) used thus far for the printing order was automatically replaced by the corrected digital template of the wooden decor and made available as a print file for the following repeat pattern. Following the output of the corrected digital template of the wooden decor, a similarity index of 96% was calculated from the first print measurement data.

The period of time from the collection of the print measurement data to the point at which the digital template of the wooden decor was corrected, replaced and output, corresponds to the gap between two panels (140 cm=approximately 0.95 seconds). In this case, an entire repeat pattern was measured, saved and a deviation detected. In the following gap, the corrected data were printed, as this is the time required for the calculation and exchange.

Due to the quick adjustment and replacement of the wooden decor print data, the production was once again able to correspond to the specifications of the similarity index within the space of one gap.

Embodiment Example 3—Paper Digital Print of a Decoration

A wooden decor has been printed on paper digital printing equipment. In the specific embodiment example, the working width was 2070 mm. In the specific embodiment example, the speed was 135 m/min. A white decorative paper with a grammage of 65 g/m$^2$ was used as well as water-based CRYK ink and an inline primer application of approximately 3 g/m$^2$. The wood decor had the repeat pattern dimensions of 1400 mm length and the width 2070 mm. In the production facility, an inline monitoring system from the company ipac was installed across the entire width (2070 mm). A digital template of the decoration was stored. During production, print measurement data of each repeat pattern, i.e. each printed decoration, is detected and stored. From these print measurement data, the similarity index to the reference measurement data is calculated. The predetermined criterion was set at 95% before the start of production. So, if the measure for the deviation falls below 95% in this case, the digital template must be modified. In the case of repeat pattern 4587, a similarity index of 63% was calculated. The measurement data showed that the deviation largely lies on the L axis>light-dark (e.g. 30% to dark). Since the deviation lies above the set tolerance, the measurement data are automatically transmitted to the Colorgate software and a corrected digital template of the wooden decor is calculated and saved. Following the automatic transmission to the output device, the print file (digital template) used thus far for the printing order is automatically replaced by the corrected digital template of the wooden decor and made available as a print file for the following repeat pattern. Following the output of the corrected digital template of the wooden decor, a similarity index of 75% was calculated from the first print measurement data.

In this case, the reason for the deviation was that a wrong type of paper was printed on. The software was not able to correct this strong deviation.

There was an acoustic signal that made the machine operator aware of the deviation. The production facility was stopped, the dryer was set lower and production continued.

Embodiment Example 4—Digital Print of a Decorative Panel—Correction not Possible—Panel Too Cold—then Signal A wooden decor was produced on panel digital printing equipment (working width 2070 mm, panel size 2070 mm×2800 mm, speed 80 m/min, HDF panels with a thickness of 8 mm, coated white, CRYK water-based ink, inline primer application approximately 3 g/m$^2$). The wood decor has the repeat pattern dimensions of 2800 mm length and the width 2070 mm. The gap between the panels was 140 cm. In the production facility, an inline monitoring system from the company ipac was installed across the entire width (2070 mm). During production, print measurement data of each repeat pattern, i.e. each printed decoration, is detected and stored. From these print measurement data, the similarity index to the reference measurement data is calculated. The predetermined criterion was set at 90% before the start of production. So, if the measure for the deviation falls below 90% in this case, the digital template must be modified. In the case of repeat pattern 1123, a similarity index of 58% was calculated. The measurement data showed that the deviation largely lies on the L axis>light-dark (e.g. 35% to dark). Since the deviation was above the set tolerance, the measurement data were automatically transmitted to Colorgate and a corrected digital template of the wooden decor was calculated and saved. Following the automatic transmission to the output device, the print file (digital template) used thus far for the printing order is automatically replaced by the corrected digital template of the wooden decor and made available as a print file for the following repeat pattern. Following the output of the corrected digital template of the wooden decor, a similarity index of 74% was calculated from the first print measurement data.

In this case, the reason for the deviation was that the panel temperature was too low, which meant that the applied ink dries too slowly and penetrates too deeply into the surface of the panel. The software was not able to correct this strong deviation.

There was an acoustic signal that makes the machine operator aware of the deviation and the production system stops automatically. The machine operator can check and correct the parameters of the printing system and continue production.

The invention claimed is:

1. A method for printing a decoration on a surface of a workpiece by digital printing equipment, the digital printing equipment comprising at least one application unit for applying a liquid to the workpiece and at least one dryer unit for drying the workpiece, and the method comprising:

a. providing information in an electric control unit of the digital printing equipment about an expected moisture of the workpiece to be dried, b. determining drying parameters with which the at least one dryer unit can be operated on a basis of the information provided, and c. drying the workpiece by use of the at least one dryer unit using the determined drying parameters, wherein the moisture of the surface of the workpiece is measured by at least one moisture sensor after drying by use of at least one dryer unit and compared with a predetermined target value, and wherein a measure for a deviation of the measured moisture from the predetermined target value is incorporated into a future determination of the drying parameters.

2. The method according to claim 1, wherein the information comprises:

a1. measuring the moisture of the surface of the workpiece by use of at least one moisture sensor, and a2. providing the measured moisture in the electric control unit.

3. The method according to claim 2, wherein the moisture is determined by use of an infrared (IR) measurement method and/or by determining an L value.

4. The method according to claim 1, wherein the expected moisture is calculated on the basis of information about:

at least one quantity of liquid applied to the workpiece before drying, at least one temperature, and/or a moisture of the workpiece.

5. The method according to claim 1, wherein the information provided about the expected moisture and the determined drying parameters are, in each case, a function of a position on the surface of the workpiece.

6. The method according to claim 1, wherein the workpiece is dried multiple times in various dryer units, and steps a. and b. are performed before each drying process.

7. The method according to claim 1, wherein the workpiece is dried before and/or after at least one liquid is applied to the workpiece.

8. The method according to claim 1, wherein the digital printing equipment has multiple application units, by which at least one liquid in each case is applied to the workpiece and the workpiece is dried before and/or after each application of the at least one liquid.

9. The method according to claim 1, wherein the workpiece is a paper web and a measure of a wrinkle formation on the paper web is detected in the digital printing equipment by way of a 2D and/or 3D profile measurement by use of a laser scanner.

10. The method according to claim 9, wherein the detected measure for wrinkle formation is compared with a predetermined target value and a tension applied to the workpiece is altered if the deviation between the detected measure and the target value exceeds a predetermined limit value.

11. A digital printing equipment for carrying out a method according to claim 1, comprises at least one application unit for applying a liquid to the workpiece and at least one dryer unit for drying the workpiece and an electric control unit configured to carry out a method according to claim 1.

12. The method according to claim 2, wherein the moisture is determined by use of a near infrared (NIR) or microwave measurement method and/or by determining an L value.

13. The method according to claim 2, wherein the expected moisture is calculated on the basis of information about a temperature profile over time of the workpiece, the room and/or the liquid applied.

14. A digital printing equipment for carrying out a method according to claim 1, comprises at least one application unit for applying a liquid to the workpiece and at least one dryer unit for drying the workpiece and configured to carry out a method according to claim 1.

* * * * *